United States Patent
Andersson et al.

(10) Patent No.: US 9,668,222 B2
(45) Date of Patent: May 30, 2017

(54) METHOD AND BASE STATION FOR LINK ADAPTATION OF PDCCH IN A RADIO COMMUNICATION SYSTEM

(75) Inventors: Håkan Andersson, Stockholm (SE); Jonas Fröberg Olsson, Ljungsbro (SE); Olle Rosin, Linköping (SE); John Skördeman, Brokind (SE); Wilson (Qiang) Zhang, Täby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 261 days.

(21) Appl. No.: 14/408,265

(22) PCT Filed: Jun. 28, 2012

(86) PCT No.: PCT/SE2012/050731
§ 371 (c)(1),
(2), (4) Date: Dec. 15, 2014

(87) PCT Pub. No.: WO2014/003616
PCT Pub. Date: Jan. 3, 2014

(65) Prior Publication Data
US 2015/0181534 A1    Jun. 25, 2015

(51) Int. Cl.
*H04W 52/16* (2009.01)
*H04L 1/00* (2006.01)
*H04W 72/04* (2009.01)

(52) U.S. Cl.
CPC ........... *H04W 52/16* (2013.01); *H04L 1/0015* (2013.01); *H04W 72/042* (2013.01); *H04W 72/0473* (2013.01); *Y02B 60/50* (2013.01)

(58) Field of Classification Search
CPC ... H04L 1/1819; H04L 1/0026; H04L 1/0009; H04L 1/0021; H04L 1/0003;
(Continued)

(56) References Cited

U.S. PATENT DOCUMENTS 8,989,112 B2 *  3/2015  Ghosh .................. H04L 5/0007
                                                    370/241
9,301,184 B2 *  3/2016  Bontu ............... H04W 36/0094
(Continued)

FOREIGN PATENT DOCUMENTS

WO    WO 2012/121636    9/2012

OTHER PUBLICATIONS

International Search Report and Written Opinion of the International Searching Authority, PCT Application No. PCT/SE2012/050731, May 16, 2013.
(Continued)

*Primary Examiner* — Jung-Jen Liu
(74) *Attorney, Agent, or Firm* — Sage Patent Group

(57) ABSTRACT

The present disclosure relates to a method and a serving radio base station (RBS) for link adaptation (LA) of PDCCH. The method includes obtaining information about a reduced power subframe (RPS) pattern used by a neighboring RBS. An indication of a reception quality of the PDCCH at a user equipment (UE) is obtained. A determination is made whether the obtained indication relates to an RPS or a non-RPS according to the obtained information. A first LA loop for a PDCCH to the first UE is controlled. The first LA loop relates to non-RPS. A second LA loop for the PDCCH to the UE is controlled. The second LA loop relates to RPS. At least one of the first and second LA algorithms, depending on the determining, is controlled based on the obtained indication of a reception quality.

18 Claims, 6 Drawing Sheets

(58) Field of Classification Search
CPC ......... H04L 1/0001; H04L 5/003; H04L 1/16; H04L 1/0015; H04W 72/12; H04W 1/0001; H04W 5/003; H04W 52/146; H04W 52/243; H04W 52/242; H04W 52/383; H04W 52/386; H04W 24/10; H04W 52/367
See application file for complete search history.

(56) References Cited

U.S. PATENT DOCUMENTS

| | | | |
|---|---|---|---|
| 9,369,930 B2* | 6/2016 | Geirhofer | H04L 5/0032 |
| 9,420,591 B2* | 8/2016 | Han | H04W 72/082 |
| 2004/0141460 A1* | 7/2004 | Holtzman | H04L 1/0006 370/216 |
| 2005/0201453 A1* | 9/2005 | Gu | H04L 1/1819 375/225 |
| 2010/0265862 A1* | 10/2010 | Choi | H04W 52/143 370/311 |
| 2011/0170496 A1* | 7/2011 | Fong | H04L 5/0053 370/329 |
| 2011/0269442 A1* | 11/2011 | Han | H04W 72/082 455/418 |
| 2011/0275382 A1* | 11/2011 | Hakola | H04W 24/10 455/452.2 |
| 2012/0184206 A1* | 7/2012 | Kim | H04L 5/0091 455/9 |
| 2012/0202554 A1* | 8/2012 | Seo | H04W 52/146 455/522 |
| 2012/0207105 A1* | 8/2012 | Geirhofer | H04L 5/0032 370/329 |
| 2013/0286952 A1* | 10/2013 | Ghosh | H04L 5/0007 370/329 |
| 2013/0343241 A1* | 12/2013 | Niu | H04B 15/00 370/280 |
| 2014/0233408 A1* | 8/2014 | Bontu | H04W 36/0094 370/252 |

OTHER PUBLICATIONS

3GPP, Technical Specification, "3rd Generation Partnership Project; Technical Specification Group Radio Access Network; Evolved Universal Terrestrial Radio Access (E-UTRA); Physical channels and modulation (Release 10)", 3GPP TS 36.211 V10.0.0 (Dec. 2010), 103 pp.

3GPP, Technical Specification, "3rd Generation Partnership Project; Technical Specification Group Radio Access Network; Evolved Universal Terrestrial Radio Access (E-UTRA); Multiplexing and channel coding (Release 10)", 3GPP TS 36.212 V10.0.0 (Dec. 2010), 72 pp.

3GPP, Technical Specification, "3rd Generation Partnership Project; Technical Specification Group Radio Access Network; Evolved Universal Terrestrial Radio Access (E-UTRA); Physical layer procedures (Release 10)", 3GPP TS 36.213 V10.0.0 (Dec. 2010), 98 pp.

3GPP, Technical Specification, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.0.0 (Jun. 2010), 183 pp.

ZTE, "Discussion on CRS Interference and CSI measurements in macro-pico deployment", Agenda Item: 6.8.1.1, Document for: Discussion; 3GPP TSG RAN WG1 Meeting #63, R1-105969, Jacksonville, United States, Nov. 15-19, 2010, 4 pp.

* cited by examiner

METHOD AND BASE STATION FOR LINK ADAPTATION OF PDCCH IN A RADIO COMMUNICATION SYSTEM

CROSS REFERENCE TO RELATED APPLICATIONS

This application is a 35 U.S.C. §371 national stage application of PCT International Application No. PCT/SE2012/050731, filed on 28 Jun. 2012, the disclosure and content of which is incorporated by reference herein in its entirety. The above-referenced PCT International Application was published in the English language as International Publication No. WO 2014/003616 A1 on 3 Jan. 2014.

TECHNICAL FIELD

The present disclosure relates to a method and a radio base station in a communication system for link adaptation of a physical downlink control channel.

BACKGROUND

In a typical cellular radio system, wireless terminals (also known as mobile stations and/or user equipment units (UEs)) communicate via a radio access network (RAN) to one or more core networks. User equipment units (UEs) may be, for example, mobile telephones ("cellular" telephones), desktop computers, laptop computers, and tablet computers, or stationary units, with wireless communication capability to communicate voice and/or data with a radio access network.

The radio access network covers a geographical area which is divided into cell areas, with each cell area being served by a base station, e.g., a radio base station (RBS), which in some networks is also called "NodeB" or (in Long Term Evolution (LTE)) eNodeB (eNB). A cell is a geographical area where radio coverage is provided by the radio base station equipment at a base station site. Each cell is identified by an identity within the local radio area, which is broadcast in the cell. The base stations communicate over the air interface operating on radio frequencies with the UEs within range of the base stations.

Specifications for an Evolved Universal Terrestrial Radio Access Network (E-UTRAN) are on-going within the 3rd Generation Partnership Project (3GPP). Another name used for E-UTRAN is the Long Term Evolution (LTE) Radio Access Network (RAN). LTE is a variant of a 3GPP radio access technology wherein the radio base station nodes are connected directly to a core network rather than to radio network controller (RNC) nodes. In general, in LTE the functions of a radio network controller node are performed by the radio base stations nodes. As such, the radio access network of an LTE system has an essentially "flat" architecture comprising radio base station nodes without reporting to radio network controller nodes.

The evolved UTRAN comprises evolved base station nodes, e.g., evolved NodeBs or eNBs, providing user-plane and control-plane protocol terminations toward the UEs. The eNB hosts the PHYsical (PHY), Medium Access Control (MAC), Radio Link Control (RLC), and Packet Data Control Protocol (PDCP) layers that include the functionality of user-plane header-compression and encryption. The eNodeB also offers Radio Resource Control (RRC) functionality corresponding to the control plane. The eNodeB performs many functions including radio resource management, admission control, scheduling, enforcement of negotiated UL QoS, cell information broadcast, ciphering/deciphering of user and control plane data, and compression/decompression of downlink (DL)/uplink (UL) user plane packet headers.

The LTE standard is based on multi-carrier based radio access schemes, Orthogonal Frequency-Division Multiplexing (OFDM) in the downlink and Single-Carrier Frequency-Division Multiple Access (SC-FDMA) in the uplink. Orthogonal FDM's (OFDM) spread spectrum technique distributes the data over a large number of carriers that are spaced apart at precise frequencies. This spacing provides the "orthogonality" in this technique which prevents the demodulators from seeing frequencies other than their own. The benefits of OFDM are high spectral efficiency, resiliency to RF interference, and lower multi-path distortion.

In the time domain, one subframe, Transmission Time Interval (TTI), of 1 ms duration is divided into 12 or 14 OFDM (or SC-FDMA) symbols, depending on the configuration. One OFDM (or SC-FDMA) symbol includes a number of sub-carriers in the frequency domain, depending on the channel bandwidth and configuration. One sub-carrier on one OFDM (or SC-FDMA) symbol is referred to as a resource element (RE). See, e.g., 3GPP Technical Specification 36.211.

In LTE, no dedicated data channels are used; instead, shared channel resources are used in both downlink and uplink. These shared resources, the Physical Downlink Shared Channel (PDSCH) and the Physical Uplink Shared Channel (PUSCH), are each controlled by one or more schedulers that assign(s) different parts of the downlink and uplink shared channels to different UEs for reception and transmission, respectively.

The downlink assignments (sometimes called downlink grants) for the Physical Downlink Shared Channel (PDSCH) and uplink grants for the Physical Uplink Shared Channel (PUSCH) are transmitted to UEs in a control region covering a few OFDM symbols in the beginning of each downlink subframe. The Physical Downlink Shared Channel (PDSCH) is transmitted in a data region covering all or a subset of the OFDM symbols in each downlink subframe. The size of the control region may be either, one, two, three or four OFDM symbols, and is set dynamically per subframe, sometimes within semi-statically configured restrictions (e.g., Relay-Physical Downlink Control Channel (R-PDCCH), cross-scheduled UEs in carrier aggregation).

Each assignment PDSCH or PUSCH is transmitted as a message on a physical channel named the Physical Downlink Control Channel (PDCCH) in the control region. There are typically multiple Physical Downlink Control Channels (PDCCHs) in each subframe. Downlink assignments and uplink grants are defined for only one transmission time interval (TTI). Thus, a new downlink assignment or uplink grant is sent for each TTI where the UE is expected to receive transmission, except for semi-persistent scheduling where scheduling is performed for a defined number of TTIs by identifying that a downlink assignment or uplink grant is valid for a one TTI at a time, reoccurring with a configured periodicity until it is released by a defined PDCCH message or by RRC signalling.

A PDCCH is mapped to (e.g., comprises) a number of control channel elements (CCEs). Each CCE consists of thirty six Resource Elements (REs).

A PDCCH can be transmitted with quadrature phase-sift keying (QPSK) modulation and channel coding, and can include an aggregation level of 1, 2, 4 or 8 CCEs, See, e.g., 3GPP Technical Specification 36.213. Each control channel element (CCE) may only be utilized on one aggregation level at the time. The total number of available control channel element (CCEs) in a subframe will vary depending on several parameters like number of OFDM symbols used for PDCCH, number of antennas used for transmission/reception, system bandwidth, Physical HARQ Indicator Channel (PHICH) size, etc.

The number of CCEs, and thereby the code rate, used for transmission of a PDCCH message from a network node to a UE can be controlled based on channel state information (CSI) that is reported by the UE. The CSI can include a Channel-Quality Indication (CQI), a rank indication, and a precoder matrix indication. A UE generates the CSI based on measurements performed on CSI reference signals (RS) transmitted by the network node. The interference measured on these references signals, from RSs or data traffic, might be correlated with the interference experienced by a PDCCH. However, data traffic and its resulting interference dynamically changes over time, and these changes may not be correlated with PDCCH interference changes.

Consequently, controlling CCE allocation (a type of Link Adaptation (LA)) for PDCCH messages solely based on CSI may lead to inefficient allocation of CCEs. Inefficient allocation of CCEs may be particularly problematic when handling low-bandwidth services and/or uplink communications (which are typically limited to more narrowband allocation than downlink due to UE transmission power limitations) where a lack of available CCEs can limit how many UEs can be scheduled in the same TTI on different frequency segments to utilize the available bandwidth.

In a heterogeneous network deployment, the base stations (eNB) typically transmit with different power levels. This leads to imbalance problems around low power nodes since the high-power node (macro base station) may be selected as the serving cell since received signal strength is higher, although the pathloss to the low-power node (micro base station) is lower. To offload the macro (high-power) node and also improve the uplink (UL) performance, cell-section offset, also known as cell Range Expansion, can be used.

When the range of the micro (low-power) node is extended by RE, the UEs in the range expansion zone are heavily interfered by the macro node. This interference can be mitigated according to 3GPP release 10 using so called Almost Blank Subframes (ABS), see 3GPP Technical Specification 36.300, where certain subframes are protected, meaning that the macro node is not allowed to transmit in those subframes (as a result, the subframes are almost blank). ABS can be seen as a special case of Reduced Power Subframes (RPS), where the macro node is allowed to transmit, but with reduced power, in the protected subframes.

In a network where RPS is used, a wireless unit (or UE) may thus experience different interference levels for the PDCCH depending on whether the subframe is a reduced power subframe or not, i.e. a regular power subframe. Consequently, the link adaptation of the PDCCH may not be optimal for both reduced power subframes and regular power subframes.

SUMMARY

It is an objective of the present disclosure to at least alleviate a problem in the prior art in respect of link adaptation of PDCCH in a network where RPS are used.

According to an aspect of the present disclosure, there is provided a method of a serving radio base station (RBS) in a communication system, for link adaptation (LA) of a physical downlink control channel (PDCCH). The method comprises obtaining information about a reduced power subframe (RPS) pattern used by a neighbouring RBS. The method also comprises obtaining an indication of a reception quality of the PDCCH at a first user equipment (UE). The method also comprises determining whether the obtained indication relates to the reception quality in a subframe in which the neighbouring RBS is not using reduced power in accordance with the obtained RPS information, or to the reception quality in a subframe in which the neighbouring RBS is using reduced power in accordance with the obtained RPS information. The method also comprises controlling a first LA algorithm of a first LA loop for a first PDCCH to the first UE said first LA loop relating to subframes in which the neighbouring RBS is not using reduced power in accordance with the obtained RPS information. The method also comprises controlling a second LA algorithm of a second LA loop for the first PDCCH to the first UE, said second LA loop relating to subframes in which the neighbouring RBS is using reduced power in accordance with the obtained RPS information. At least one of the first and second LA algorithms, depending on said determining, is controlled based on said obtained indication of a reception quality.

According to another aspect, the present disclosure relates to a computer program product comprising computer-executable components for causing a radio base station (RBS) to perform an embodiment of the method of the present disclosure when the computer-executable components are run on a processor comprised in the RBS.

According to another aspect, the present disclosure relates to a serving radio base station (RBS) comprising a processor and a memory. The memory storing instructions that, when executed, cause the radio base station to obtain information about a reduced power subframe (RPS) pattern used by a neighbouring RBS. The executed instruction also causes the serving RBS to obtain an indication of a reception quality of the PDCCH at a first user equipment (UE). The executed instruction also causes the serving RBS to determine whether the obtained indication relates to the reception quality in a subframe in which the neighbouring RBS is not using reduced power in accordance with the obtained RPS information, or to the reception quality in a subframe in which the neighbouring RBS is using reduced power in accordance with the obtained RPS information. The executed instruction also causes the serving RBS to control a first LA algorithm of a first LA loop for a first PDCCH to the first UE, said first LA loop relating to subframes in which the neighbouring RBS is not using reduced power in accordance with the obtained RPS information. The executed instruction also causes the serving RBS to control a second LA algorithm of a second LA loop for the first PDCCH to the first UE, said second LA loop relating to subframes in which the neighbouring RBS is using reduced power in accordance with the obtained RPS information. At least one of the first and second LA algorithms, depending on said determining, is controlled based on said obtained indication of a reception quality. The serving RBS may thus be configured for performing an embodiment of the method of the present invention.

According to another aspect, the present disclosure relates to a computer program for link adaptation (LA) of a physical downlink control channel (PDCCH). The computer program comprises computer program code which is able to, when run on a radio base station (RBS) cause the RBS to obtain information about a reduced power subframe (RPS) pattern used by a neighbouring RBS. The code is also able to cause the RBS to obtain an indication of a reception quality of the PDCCH at a first user equipment (UE). The code is also able to cause the RBS to determine whether the obtained indication relates to the reception quality in a subframe in which the neighbouring RBS is not using reduced power in accordance with the obtained RPS information, or to the reception quality in a subframe in which the neighbouring RBS is using reduced power in accordance with the obtained RPS information. The code is also able to cause the RBS to control a first LA algorithm of a first LA loop for a first PDCCH to the first UE, said first LA loop relating to subframes in which the neighbouring RBS is not using reduced power in accordance with the obtained RPS information. The code is also able to cause the RBS to control a second LA algorithm of a second LA loop for the first PDCCH to the first UE, said second LA loop relating to subframes in which the neighbouring RBS is using reduced power in accordance with the obtained RPS information. At least one of the first and second LA algorithms, depending on said determining, is controlled based on said obtained indication of a reception quality.

According to another aspect, the present disclosure relates to a computer program product comprising an embodiment of the computer program of the present disclosure, and a computer readable means on which the computer program is stored.

By using different LA loops of the PDCCH for different subframes, depending on whether a subframe is an RPS or not, the PDCCH may be improved and adapted for different interference situations. According to the present disclosure, this is advantageously achieved by obtaining an indication of the PDCCH reception quality at the UE and determining whether this indicated reception quality relates to a subframe where a potentially interfering neighbouring RBS uses a reduced power subframe or not. The serving RBS knows when (in time) the neighbouring RBS uses RPS from the obtained information about the RPS pattern used by the neighbouring RBS.

In some embodiments, the method of the present disclosure comprises using a first code rate of the PDCCH for subframes in which the neighbouring RBS is not using reduced power in accordance with the obtained RPS information, as a result of the first LA algorithm. These embodiments may also comprise using a second code rate of the PDCCH for subframes in which the neighbouring RBS is using reduced power in accordance with the obtained RPS information, as a result of the second LA algorithm. The first and second code rates may be the same or different, but it may be convenient to use different code rates for the first and second code rates. The second code rate is in these embodiments different from the first code rate. The code rate of the PDCCH may thus be adapted to the different interference scenarios resulting from the RPS pattern. The serving RBS of the present disclosure is in some embodiments configured for performing these embodiments of the method. The LA may thus comprise adjusting the code rate (e.g. CCE allocation), but other parameters may alternatively or additionally be adjusted as part of the LA in a similar way as discussed in respect of code rate, e.g. modulation of the PDCCH, rank of MIMO (Multiple Input Multiple Output) used for the PDCCH and/or precoding (beamforming) used for the PDCCH.

In some embodiments, the RPS pattern is a pattern of almost blank subframes (ABS). The reduced power of the RPS subframes may thus be zero or close to zero in accordance with a standard for ABS.

In some embodiments, the RPS pattern indicates at least three different groups of subframes, each group being associated with a respective power level. Thus, the RPS pattern may not only comprise RPS and non-RPS, but may comprise RPS of different reduced power levels, e.g. ABS, RPS and non-RPS, increasing the flexibility of the system to reduce interference and optimise performance.

In some embodiments, the communication system is a heterogeneous communication system in which different RBSs have different maximum power levels. The power level is the maximum power of the transmissions sent by the respective RBS. The present disclosure may be especially useful for LA in heterogeneous systems where e.g. transmissions from a larger cell may interfere with PDCCH transmissions in a smaller cell within or overlapping with the larger cell. Any of the serving RBS and the neighbouring RBS(s) may be a macro, micro, pico or femto (e.g. Home Node-B) RBS. In some embodiments, the serving RBS has a lower maximum power level than the neighbouring RBS. In some embodiments, the serving RBS has about the same maximum power level as the neighbouring RBS. Both the serving RBS and any neighbouring RBS may e.g. be a micro, pico or femto RBS. In some embodiments, the neighbouring RBS(s) is a macro RBS. In some embodiments, the serving RBS is a micro, pico or femto RBS.

In some embodiments, the method of the present disclosure further comprises obtaining information about a reduced power subframe (RPS) pattern used by a second neighbouring RBS. These embodiments may also comprise determining whether the obtained indication of a reception quality relates to the reception quality in a subframe in which the second neighbouring RBS is not using reduced power in accordance with the obtained RPS information, or to the reception quality in a subframe in which the second neighbouring RBS is using reduced power in accordance with the obtained RPS information. These embodiments may also comprise controlling a third LA algorithm of a third LA loop for the first PDCCH to the first UE, said third LA loop relating to subframes in which the neighbouring RBS is not using reduced power and in which the second neighbouring RBS is using reduced power in accordance with the obtained RPS information. These embodiments may also comprise controlling a fourth LA algorithm of a fourth LA loop for the first PDCCH to the first UE, said fourth LA loop relating to subframes in which the neighbouring RBS is using reduced power and in which the second neighbouring RBS is not using reduced power in accordance with the obtained RPS information. At least one of the third and fourth LA algorithms, depending on said determining, is controlled based on said obtained indication of a reception quality. Thus, the method of the present disclosure may also be used when there are a plurality of potentially interfering neighbouring RBS(s). In a case where there are two neighbouring RBS(s) to be considered, each having two power levels (RPS and non-RPS), there will be four permutations of different interference situations for the PDCCH to the UE: subframes where both neighbouring RBS(s) has RPS, where both neighbouring RBS(s) has non-RPS, where the first neighbouring RBS has RPS and the second has non-RPS, and where the first neighbouring RBS has non-RPS and the second has RPS. Thus, four different LA loops may conveniently be used. If more than two neighbouring RBSs are considered, or if there are more than two power levels of an RPS pattern, there will be even more permutations and correspondingly more LA loops may conveniently be used. The serving RBS of the present disclosure is in some embodiments configured for performing these embodiments of the method.

In some embodiments, the obtaining of an indication of a reception quality comprises receiving channel state information (CSI), e.g. channel quality indicator (CQI) reports, rank indicator (RI), precoding matrix indicator (PMI), and/or subband information (e.g. subband offset for CQI, subband PMI), from the first UE and relating to a physical downlink shared channel (PDSCH) between the serving RBS and said first UE. The CQI reports relating to a shared channel may thus be used as an indication of the reception quality/interference of the PDCCH.

In some embodiments, the obtaining of an indication of a reception quality comprises detecting whether an expected transmission from the first UE is received or not in response to a PDCCH transmission from the serving RBS. For instance, if the serving RBS sends a UL grant on the PDCCH to the UE, whether or not the RBS then receives the UL transmission in accordance with the UL grant is an indication of whether the reception quality is good enough for the UE to have received the UL grant ok or too bad so that the UE did not receive the UL grant ok. Similarly, if the serving RBS sends a DL assignment on the PDCCH to the UE, whether or not the RBS then receives a response to the DL transmission such as a feedback acknowledgement (ACK) or negative ACK (NAK or NACK) is an indication of whether the reception quality is good enough for the UE to have received the DL assignment ok or too bad so that the UE did not receive the DL assignment ok.

In some embodiments, the obtaining of an indication of a reception quality comprises receiving channel quality information about the PDCCH from the first UE. In these embodiments, the UE is able to send channel quality information about the PDCCH, not only about the PDSCH.

In some embodiments, the method of the present disclosure further comprises obtaining an indication of a reception quality of a second PDCCH at a second user equipment (UE). These embodiments may also comprise determining whether the obtained indication of a reception quality of a second PDCCH relates to the reception quality in a subframe in which the neighbouring RBS is not using reduced power in accordance with the obtained RPS information, or to the reception quality in a subframe in which the neighbouring RBS is using reduced power in accordance with the obtained RPS information. These embodiments may also comprise controlling a first LA algorithm of a first LA loop for the second PDCCH to the second UE, said first LA loop for the second PDCCH relating to the subframes in which the neighbouring RBS is not using reduced power in accordance with the obtained RPS information. These embodiments may also comprise controlling a second LA algorithm of a second LA loop for the second PDCCH to the second UE, said second LA loop for the second PDCCH relating to the subframes in which the neighbouring RBS is using reduced power in accordance with the obtained RPS information. At least one of the first and second LA algorithms for the second PDCCH, depending on said determining, is controlled based on said obtained indication of a reception quality of said second PDCCH. Thus, the method may be performed for each of a plurality of UEs connected to the serving RBS. LA may be performed individually for each of said UEs, for their respective PDCCH. The serving RBS of the present disclosure is in some embodiments configured for performing these embodiments of the method.

In some embodiments, the RPS information is obtained from the neighbouring RBS(s) over an X2 interface between the serving RBS and the neighbouring RBS(s). This reduces the stress on the core network (CN).

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
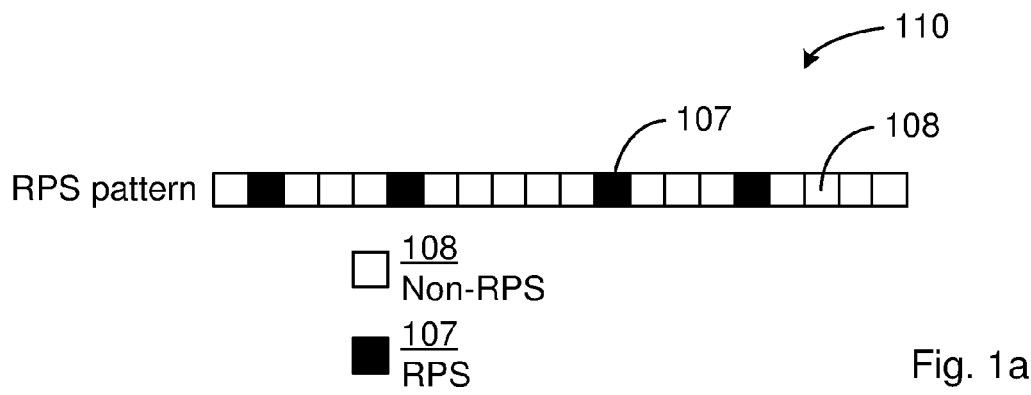
FIG. 1a is a schematic illustration of an RPS pattern.

FIG. 1a schematically illustrates an RPS pattern 110 in time domain (however, frequency domain is also possible). The RPS pattern is divided into a plurality of time slots (here subframes) 107 and 108, where the filled subframes 107 illustrates reduced power subframes (RPS) and the unfilled subframes 108 illustrates regular power subframes (non-RPS). Such an RPS pattern may be used e.g. by the macro RBS 102 in order to reduce interference of the micro RBS 101.

Figure 1B:
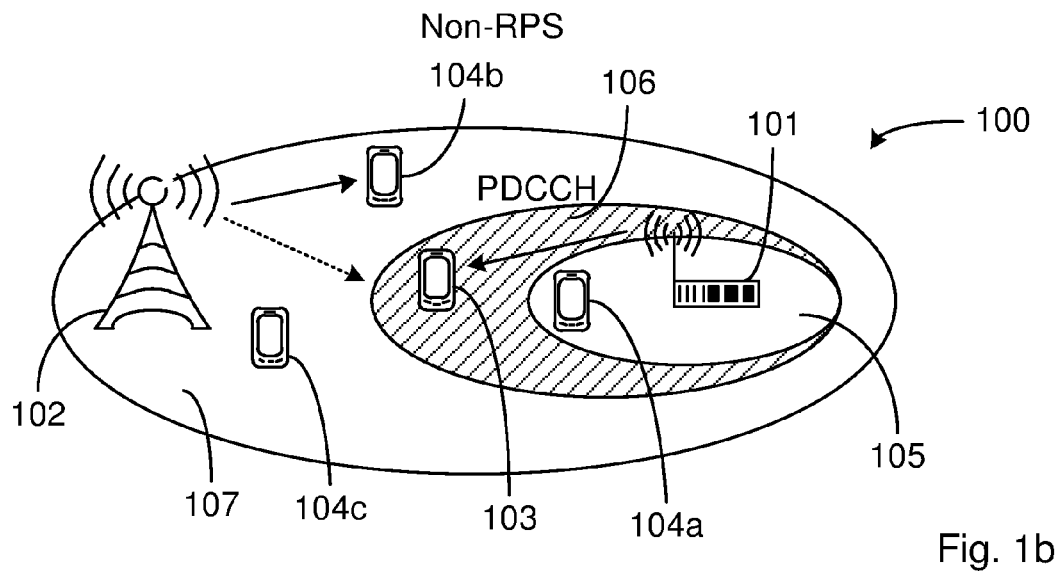
FIG. 1b is a schematic illustration of an embodiment of a heterogeneous communication system during a non-RPS subframe.

FIG. 1b schematically illustrates a heterogeneous communication system 100 during a non-RPS subframe 108. The system 100 comprises a macro RBS (e.g. an evolved Node-B, eNB) 102 covering a geographical area of a micro RBS (e.g. an evolved Node-B, eNB) 101. The macro RBS 102 services a macro cell 107, and the micro RBS 101 services a micro cell 105, geographically comprised within the macro cell 107. By means of range expansion, the cell 105 served by the micro RBS 101 is extended with an range expansion zone 106. A first UE 103 is served by the micro RBS 101 but is positioned in the range expansion zone 106, making it at risk for substantial interference from the macro RBS 102. A plurality of other (second) UEs 104 are shown in the figure, both within the micro cell 105 and outside but within the macro cell 107. As illustrated with arrows in the FIG. 1b, since the subframe is non-RPS, the PDCCH transmission from the micro RBS 101 to its served UE 103 is interfered by the PDCCH transmission from the macro RBS 102 to its served UE 104b. If the micro RBS 101 is considered the serving RBS, the macro RBS 102 is considered a neighbouring RBS. More neighbouring RBS(s) 102 may be considered, depending on the design of the system 100. A neighbouring RBS 102 as discussed herein is any RBS about which the serving RBS 101 obtains RPS pattern information. The neighbouring RBS(s) 102 may be any RBS(s) which potentially interferes with a PDCCH transmission to UE(s) 103 connected to/served by the serving RBS 101.

Figure 1C:
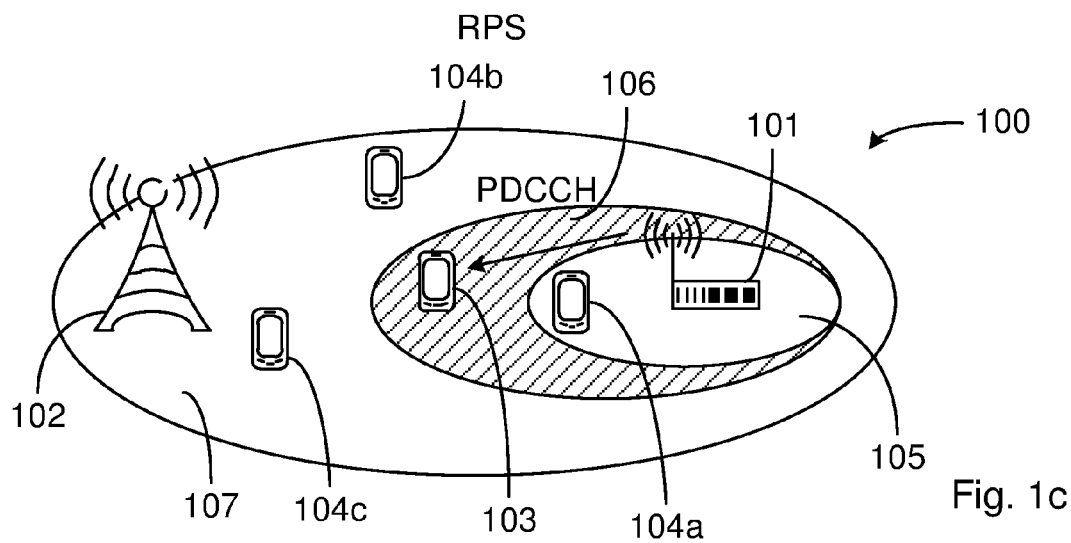
FIG. 1c is a schematic illustration of an embodiment of a heterogeneous communication system during an RPS subframe.

FIG. 1c schematically illustrates the same system 100 as in FIG. 1b, but in an RPS subframe. As is illustrated by the arrow, the PDCCH transmission from the micro RBS 101 is not interfered with by any PDCCH transmission from the macro RBS 102 since the macro RBS does not transmit, or transmits at reduced power, in the RPS.

Due to the definition of RPS/ABS, the PDCCH is subject to different interference scenarios or situations in RPS (protected subframes) and non-RPS (unprotected subframes). This is conceptually illustrated in FIG. 1. In the non-RPS, the UE 103 (connected to/served by the micro RBS 101) is subject to interference caused by transmissions in/from the macro base station 102. In the RPS, the UE 103 is subject to reduced interference from the macro base station 102 since it is muted (if ABS) or transmits at reduced power, based on the RPS pattern 110.

Any of the UEs 103 and/or 104 are radio communication terminals, including mobile devices e.g. a mobile phone or a portable computer, or stationary devices such as sensors, vending machines, household appliances etc. The UE may connect to a network, such as a Core Network (CN), via any suitable RBS and via any suitable RAT.

Figure 2:
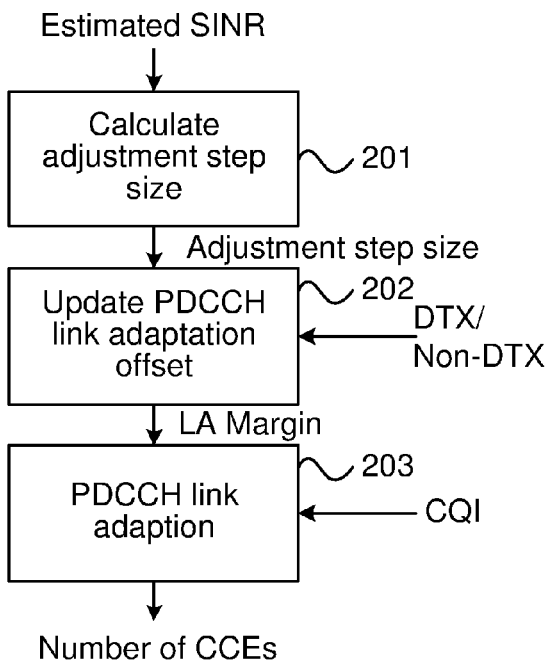
FIG. 2 is a schematic flow chart of an embodiment of a method for a single LA loop.

In current communication standards, the reception quality of the PDCCH is not reported specifically. However, the reception quality of a corresponding PDSCH is reported by means of CSI, e.g. CQI. A solution for PDCCH link adaptation is to use a single control loop. PDCCH link adaptation in such a scenario will not be optimal since the link adaptation algorithm will try to adapt to the different interference situations of RPS and non-RPS even though the interference is different in non-RPS and RPS. An example of such a PDCCH link adaption control loop based on CQI and an LA margin (could alternatively be called an SNR back-off margin) is illustrated in FIG. 2. In addition to CQI, whether or not an expected response to a PDCCH transmission is received (as discussed herein) can be used as an indication of PDCCH interference. Discontinued transmission (DTX) here indicates that the expected transmission is not received, while non-DTX indicates that the expected transmission is received. In RPS, the PDCCH Block Error Rate (BLER) is low compared to a non-RPS in which the PDCCH BLER is higher. This means that the PDCCH resources are not efficiently utilized using a single PDCCH link adaptation control loop. The estimated SINR is inputted to a calculation 201 of an adjustment step size which is then applied to the LA (e.g. adjusting the code rate/number of CCEs). The PDCCH LA offset is updated in 202 to produce an LA margin. Information of DTX/non-DTX may be considered in the update 202 step, or in an other step 201 or 203. The PDCCH is then link adapted in 203, possibly considering CQI reports for the corresponding PDSCH. As with DTX, CQI may alternatively be used as input at an other step 201 or 202.

Figure 3:
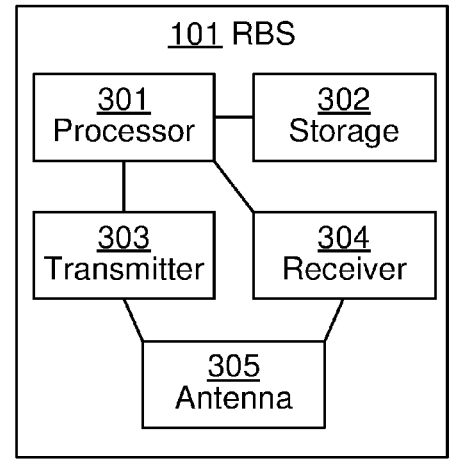
FIG. 3 is a schematic box diagram of an embodiment of an RBS of the present disclosure.

FIG. 3 schematically illustrates an embodiment of an RBS 101 of the present disclosure. The RBS 101 may be configured for any suitable communication standard, such as LTE. The RBS 101 comprises a processor 301 e.g. a central processing unit (CPU). The processor 301 may comprise one or a plurality of processing units in the form of microprocessor(s). However, other suitable devices with computing capabilities could be comprised in the processor 301, e.g. an application specific integrated circuit (ASIC), a field programmable gate array (FPGA) or a complex programmable logic device (CPLD). The processor 301 is configured to run one or several computer program(s) or software stored in a storage unit 302 e.g. a memory. The storage unit is regarded as a computer readable means and may e.g. be in the form of a Random Access Memory (RAM), a Flash memory or other solid state memory, or a hard disk. The processor 301 is also configured to store data in the storage unit 302, as needed. The RBS 101 also comprises a transmitter 303, a receiver 304 and an antenna 305, which may be combined to form a transceiver or be present as distinct units within the RBS 101. The transmitter 303 is configured to cooperate with the processor to transform data bits to be transmitted over a radio interface to a suitable radio signal in accordance with the radio access technology (RAT) used by the RAN via which the data bits are to be transmitted. The receiver 304 is configured to cooperate with the processor 301 to transform a received radio signal to transmitted data bits. The antenna 305 may comprise a single antenna or a plurality of antennas, e.g. for different frequencies and/or for MIMO (Multiple Input Multiple Output) communication. The antenna 305 is used by the transmitter 303 and the receiver 304 for transmitting and receiving, respectively, radio signals.

Figure 4:
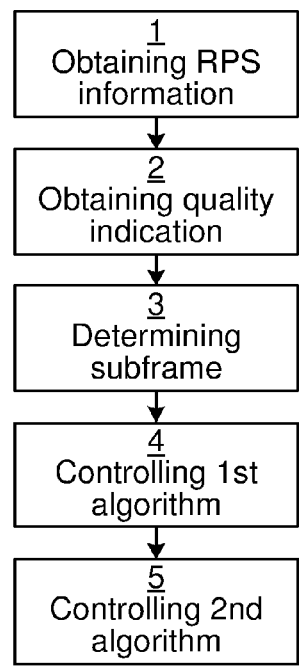
FIG. 4 is a schematic flow chart of an embodiment of a method of the present disclosure.

FIG. 4 schematically illustrates an embodiment of the method of a serving RBS 101, of the present disclosure. The method comprises obtaining 1 information about a reduced power subframe (RPS) pattern used by a neighbouring RBS 102. The method also comprises obtaining 2 an indication of a reception quality of the PDCCH at a first UE 103. The method also comprises determining 3 whether the obtained 2 indication relates to the reception quality in a subframe 108 in which the neighbouring RBS 102 is not using reduced power in accordance with the obtained 1 RPS information, or to the reception quality in a subframe 107 in which the neighbouring RBS 102 is using reduced power in accordance with the obtained 1 RPS information. From the obtained 1 RPS pattern information, the serving RBS 101 knows in which subframes the neighbouring RBS 102 transmits with reduced, or no, power. The obtained 2 quality information regarding reception quality at the first UE 103 relates to the reception quality in a certain DL subframe. This indication may be obtained 2 in an UL subframe in a time slot later than the DL subframe to which it relates. As discussed herein, the quality indication may e.g. be a CSI of a DL subframe of the PDSCH which hints at the channel quality also of the PDCCH in that subframe. Alternatively or additionally, the quality indication may e.g. be the presence or absence of an expected UL transmission in response to a PDCCH DL transmission, wherein the absence of the UL transmission indicates that the reception quality at the UE 103 of the PDCCH subframe in which the PDCCH DL transmission was sent is poor since the DL transmission apparently was not received ok by the UE 103 (in this embodiment, the serving RBS needs to remember in which subframe the PDCCH DL transmission was sent, and correlate this with the RPS pattern). The method also comprises controlling 4 a first LA algorithm of a first LA loop for a first PDCCH to the first UE 103 said first LA loop relating to subframes 108 in which the neighbouring RBS 102 is not using reduced power in accordance with the obtained 1 RPS information. The method also comprises controlling 5 a second LA algorithm of a second LA loop for the first PDCCH to the first UE 103, said second LA loop relating to subframes 107 in which the neighbouring RBS 102 is using reduced power in accordance with the obtained 1 RPS information. At least one of the first and second LA algorithms, depending on said determining 3, is controlled 4, 5 based on said obtained 2 indication of a reception quality.

Figure 5:
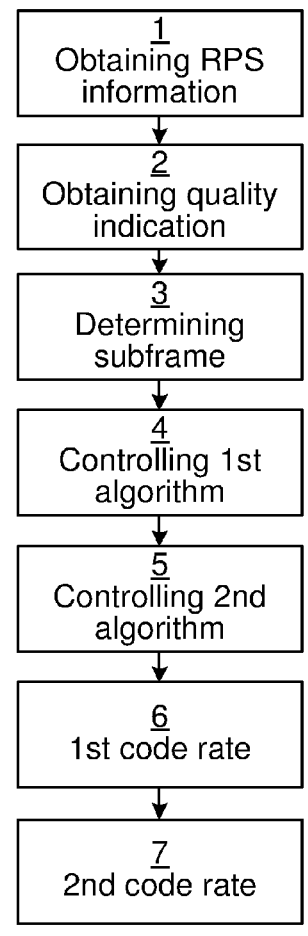
FIG. 5 is a schematic flow chart of another embodiment of a method of the present disclosure.

FIG. 5 schematically illustrates another embodiment of the method of a serving RBS 101, of the present disclosure. The steps of obtaining 1 RPS information, obtaining 2 a reception quality indication, determining 3 type of subframe, controlling 4 the first LA loop and controlling 5 the second LA loop, are as discussed above in respect of FIG. 4. The method of FIG. 5 further comprises using 6 a first code rate of the PDCCH for subframes 108 in which the neighbouring RBS 102 is not using reduced power in accordance with the obtained 1 RPS information, as a result of the first LA algorithm. The first LA algorithm is thus controlled 4 to use 6 the first code rate. The method of FIG. 5 further comprises using 7 a second code rate of the PDCCH for subframes 107 in which the neighbouring RBS 102 is using reduced power in accordance with the obtained 1 RPS information, as a result of the second LA algorithm. The second LA algorithm is thus controlled 5 to use 7 the second code rate. The first and second code rates may be the same or different, but it may be convenient to use different code rates for the first and second code rates. The second code rate is in these embodiments different from the first code rate. The code rate of the PDCCH may thus be adapted to the different interference scenarios resulting from the RPS pattern. The serving RBS of the present disclosure is in some embodiments configured for performing these embodiments of the method. The LA may thus comprise adjusting the code rate (e.g. CCE allocation), but other parameters may alternatively or additionally be adjusted as part of the LA in a similar way as discussed in respect of code rate, e.g. modulation of the PDCCH, rank of MIMO (Multiple Input Multiple Output) used for the PDCCH and/or precoding (beamforming) used for the PDCCH.

Figure 6:
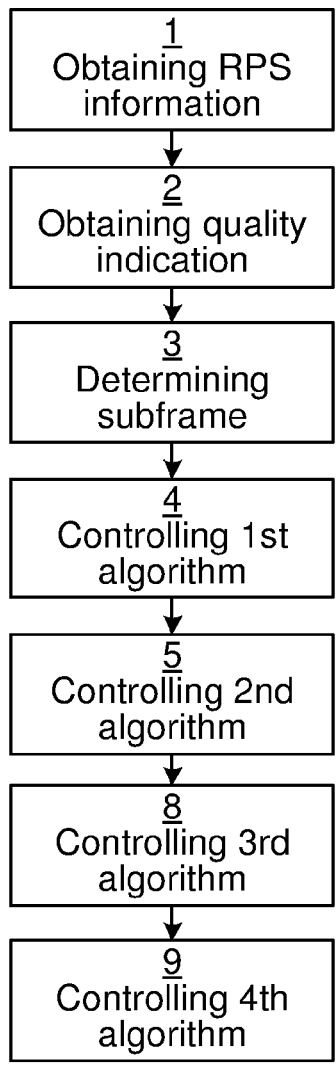
FIG. 6 is a schematic flow chart of another embodiment of a method of the present disclosure.

FIG. 6 schematically illustrates another embodiment of the method of a serving RBS 101, of the present disclosure. The steps of obtaining 1 RPS information, obtaining 2 a reception quality indication, determining 3 type of subframe, controlling 4 the first LA loop and controlling 5 the second LA loop, are as discussed above in respect of FIG. 4. The method of FIG. 6 further comprises obtaining 1 information about a reduced power subframe (RPS) pattern 110 used by a second neighbouring RBS 102 (similar or different than the first neighbouring RBS 102, all neighbouring RBSs here being referred to with the reference numeral 102) as part of the obtaining 1 of RPS information discussed in respect of FIG. 4. The method of FIG. 6 further comprises determining 3 (as part of the determining 3 of subframe type discussed in respect of FIG. 4) whether the obtained 2 indication of a reception quality relates to the reception quality in a subframe 108 in which the second neighbouring RBS is not using reduced power in accordance with the obtained 1 RPS information, or to the reception quality in a subframe 107 in which the second neighbouring RBS is using reduced power in accordance with the obtained 1 RPS information. The method of FIG. 6 further comprises controlling 8 a third LA algorithm of a third LA loop for the first PDCCH to the first UE 103, said third LA loop relating to subframes in which the (first) neighbouring RBS is not using reduced power and in which the second neighbouring RBS is using reduced power in accordance with the obtained 1 RPS information The method of FIG. 6 further comprises controlling 9 a fourth LA algorithm of a fourth LA loop for the first PDCCH to the first UE 103, said fourth LA loop relating to subframes in which the neighbouring RBS is using reduced power and in which the second neighbouring RBS is not using reduced power in accordance with the obtained RPS information. At least one of the third and fourth LA algorithms, depending on said determining 3, is controlled 8, 9 based on said obtained 2 indication of a reception quality. Thus, the method of the present disclosure may also be used when there are a plurality of potentially interfering neighbouring RBS(s) 102. In a case where there are two neighbouring RBS(s) to be considered, each having two power levels (RPS and non-RPS), there will be four permutations of different interference situations for the PDCCH to the UE 103: subframes where both neighbouring RBS(s) has RPS, where both neighbouring RBS(s) has non-RPS, where the first neighbouring RBS has RPS and the second has non-RPS, and where the first neighbouring RBS has non-RPS and the second has RPS. Thus, four different LA loops may conveniently be used. If more than two neighbouring RBSs are considered, or if there are more than two power levels of an RPS pattern, there will be even more permutations and correspondingly more LA loops may conveniently be used. The serving RBS 101 of the present disclosure is in some embodiments configured for performing these embodiments of the method.

Figure 7:
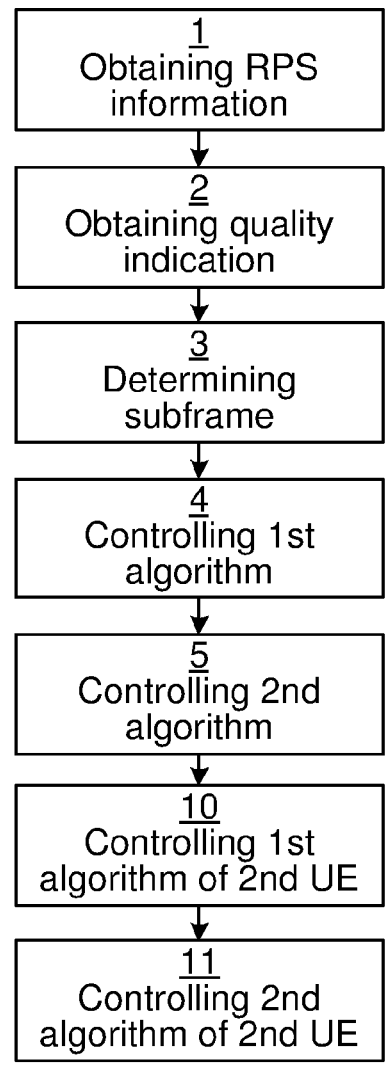
FIG. 7 is a schematic flow chart of another embodiment of a method of the present disclosure.

FIG. 7 schematically illustrates another embodiment of the method of a serving RBS 101, of the present disclosure. The steps of obtaining 1 RPS information, obtaining 2 a reception quality indication, determining 3 type of subframe, controlling 4 the first LA loop and controlling 5 the second LA loop, are as discussed above in respect of FIG. 4. The method of FIG. 7 further comprises obtaining 1 an indication of a reception quality (as part of the obtaining 1 of RPS information discussed in respect of FIG. 4) of a second PDCCH at a second user equipment (UE) 104. The method of FIG. 7 further comprises determining 3 (as part of the determining 3 of subframe type discussed in respect of FIG. 4) whether the obtained indication of a reception quality of a second PDCCH relates to the reception quality in a subframe in which the neighbouring RBS 102 is not using reduced power in accordance with the obtained RPS information, or to the reception quality in a subframe in which the neighbouring RBS 102 is using reduced power in accordance with the obtained 1 RPS information. The method of FIG. 7 further comprises controlling 10 a first LA algorithm of a first LA loop for the second PDCCH to the second UE 104, said first LA loop for the second PDCCH relating to the subframes in which the neighbouring RBS 102 is not using reduced power in accordance with the obtained 1 RPS information. These embodiments may also comprise controlling a second LA algorithm of a second LA loop for the second PDCCH to the second UE 104, said second LA loop for the second PDCCH relating to the subframes in which the neighbouring RBS 102 is using reduced power in accordance with the obtained 1 RPS information. At least one of the first and second LA algorithms for the second PDCCH, depending on said determining 3, is controlled 10, 11 based on said obtained 2 indication of a reception quality of said second PDCCH. Thus, the method may be performed for each of a plurality of UEs 103, 104 connected to the serving RBS 101. LA may be performed individually for each of said UEs, for their respective PDCCH. The serving RBS 101 of the present disclosure is in some embodiments configured for performing these embodiments of the method.

Example 1

The PDCCH link adaptation may be done by multiple control loops that adjust the PDCCH code rate based on estimated channel quality. Channel quality indicators could comprise Channel Quality Indicator (CQI) reports or PDCCH decoding failure symptoms such as poor channel quality on PUSCH/PUCCH estimated from PUSCH/PUCCH demodulation reference symbols, detection/decoding failure of expected UCI (Uplink Control Information) such as CQI and/or Ack-Nack reports or decoding failure of expected uplink transmission.

Example 2—Multiple Control Loops for Link Adaptation

The different ABS and RPS patterns 110 that can be used in LTE heterogeneous systems 100 imply that, based on a single and/or a combination of such patterns, the UE 103 is subject to different interference scenarios. Multiple PDCCH control loops can be employed, using partly or completely separated input and control states to derive the number of CCEs used for PDCCH transmission. The input to such a control loop can comprise any of e.g.:
  CQI reports
  Information regarding DTX or non-DTX subframe (i.e. whether a message from the UE 103 in response to a transmission from the RBS 101 in the subject subframe is detected or not).
  signal-to-noise ratio (SNR) back-off offset, i.e. LA margin.

Each loop would in this case contain a state that is only based on the estimated channel quality of the considered RPS pattern 110 and/or combination of RPS patterns 110, further referred to as RPS information. The RPS information comprises e.g. any of:
  Information about a static RPS pattern 110.
  Information about a dynamic RPS pattern obtained by communication between base stations 101 and 102, for example through a backhaul.

Figure 8:
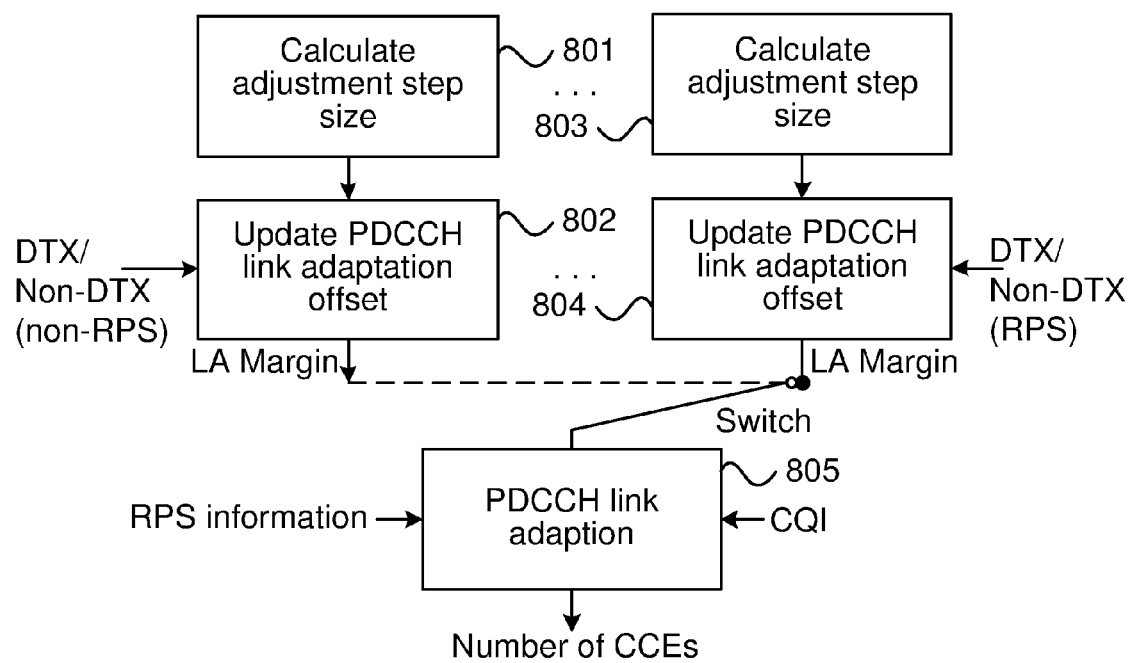
FIG. 8 is a schematic flow chart of another embodiment of a method of the present disclosure.
Figure 9:
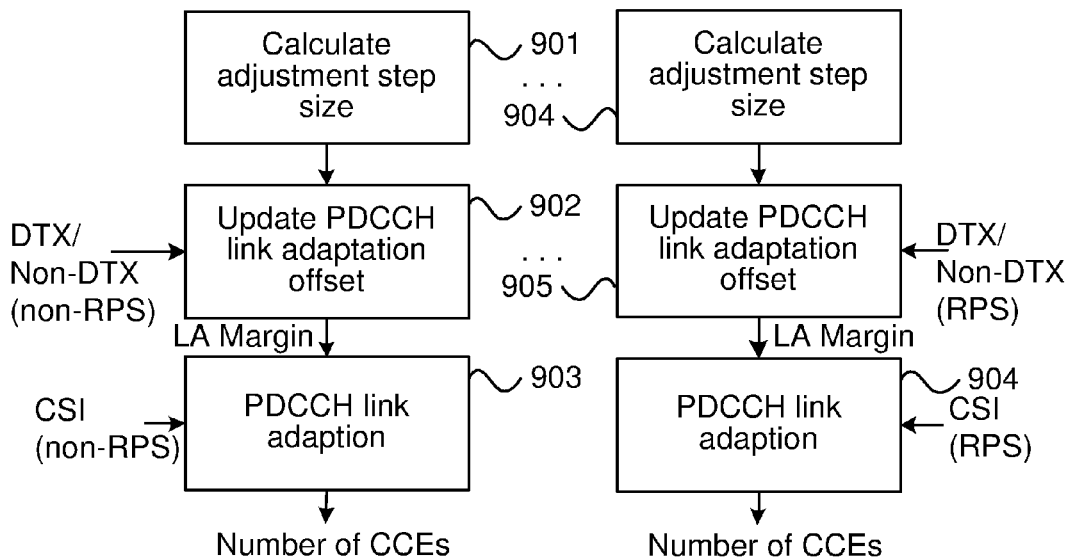
FIG. 9 is a schematic flow chart of another embodiment of a method of the present disclosure.

When evaluating and adapting the number of required CCEs (i.e. the code rate) in the PDCCH link adaptation algorithm, which loop to be used is decided based on RPS information. This is conceptually illustrated in FIGS. 8 and 9, where FIG. 8 illustrates PDCCH link adaptation using multiple control loops and loop states that are switched between based on RPS pattern information, while FIG. 9 illustrates a similar solution based on CSI values for non-RPS 108 and RPS 107. In FIG. 8, the steps discussed in respect of FIG. 2 are run in parallel (for RPS and non-RPS, respectively) as regards the two first steps 201 and 202. The estimated SINR is inputted to a calculation 801 resp. 803 of an adjustment step size which is then applied to the LA (e.g. adjusting the code rate/number of CCEs). The PDCCH LA offset is updated 802 resp. 804 to produce an LA margin. The last step of PDCCH LA 805 (corresponding to step 203 of FIG. 2) switches between the two parallel loops 801 and 803 resp. 802 and 804, depending on the obtained 1 RPS information. FIG. 9 illustrates a similar embodiment as FIG. 8. In FIG. 9, the steps discussed in respect of FIG. 2 are run in parallel (for RPS and non-RPS, respectively) as regards all the three steps 201, 202 and 203. The estimated SINR is inputted to a calculation 901 resp. 903 of an adjustment step size which is then applied to the LA (e.g. adjusting the code rate/number of CCEs). The PDCCH LA offset is updated 902 resp. 904 to produce an LA margin. PDCCH LA 903 resp. 904 is then performed in parallel for RPS and non-RPS, respectively.

Example 3—Low Power Downlink Control Signalling in RPS

In this embodiment, the macro RBS 102 sends UL grants on PDCCH with lower power in RPS 107 than in non-RPS 108. This means that UL grants may be sent in both RPS and non-RPS.

Figure 10:
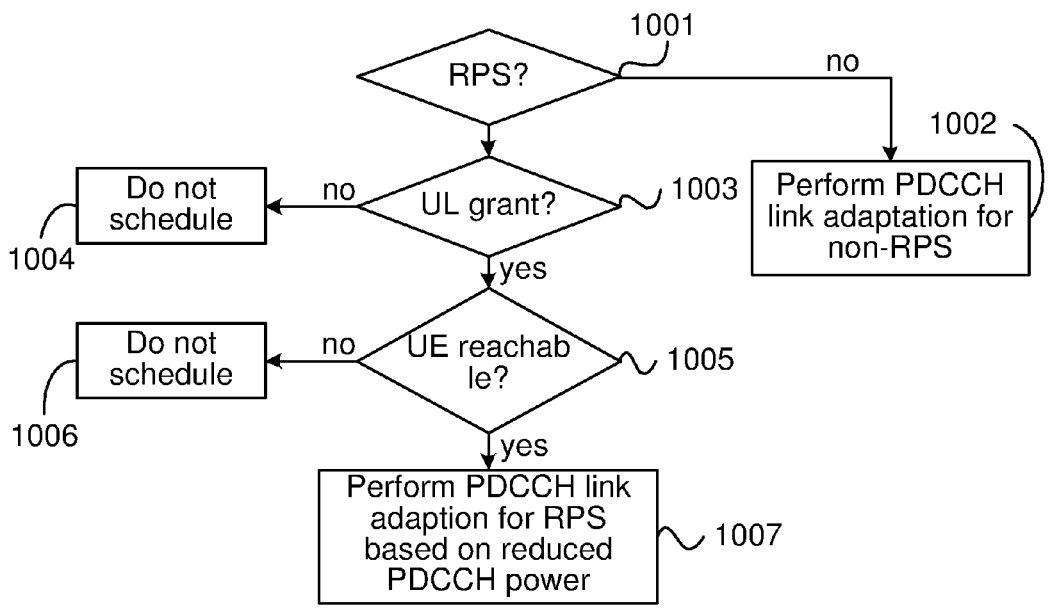
FIG. 10 is a schematic flow chart of another embodiment of a method of the present disclosure.

For the macro RBS 102, with reference to FIG. 10, the scheduler performs the following: In the scheduling phase, the scheduler determines 1001 if current subframe is RPS 107 or not. If the subframe is non-RPS 108, then PDCCH link adaptation for non-RPS is performed 1002. If the subframe is RPS, then the scheduler disregards 1004 the SE (Scheduled Entity, here UE 104) if it requests a DL grant. For UL grants, the scheduler then determines 1005 if the UE is reachable with reduced power. This can be accomplished using measurement reports of RSRP (Reference Signal Received Power) to the serving cell 107 of the UE 104, where the UE 104 is determined to be out-of-reach if the RSRP to serving cell 107 is below some predetermined threshold. If UE 104 is determined to be out-of-reach, the scheduler decides 1006 not to schedule the UE. If UE 104 is determined to be reachable using reduced power, the scheduler performs 1007 link adaptation for RPS. The above procedure is illustrated in the flow chart in FIG. 10. It should be noted that the tasks may be performed in different order than described above. For example, the check for UL grant and RPS can be performed in reverse order. Alternatively, if the UE 104 is determined to be reachable with both PDCCH and PDSCH with reduced power, the macro base station 102 may send both UL and DL grants if the RPS is not ABS.

The two link adaptation loops for RPS and non-RPS can be implemented using signal to interference and noise ratio (SINR) offsets (O) depending on whether a subframe is RPS or not. For example, the adjusted SINR used in the PDCCH link adaptation may be calculated as:

$SINR_{adj} = SINR_{CSI} + O_{RPS}$ if subframe is RPS; and $SINR_{adj} = SINR_{CSI} + O_{non-RPS}$ if subframe is non-RPS Above, the $SINR_{CSI}$ is the estimated SINR for PDCCH based on CSI (Channel State Information) feedback. The $O_{RPS}$ and $O_{non-RPS}$ are configurable SINR offset in dB for RPS and non-RPS, respectively.

Example 4—PDCCH Link Adaptation for Micro Inner Zone UEs

Also for UEs connected to the micro RBS 101 which are not in the range expansion zone 106, i.e., UEs in inner zone 105 "close" to the micro RBS 101 (see FIG. 1), the interference situation on PDCCH will become different between RPS 107 and non-RPS 108. For RPS, the macro RBS 102 will not send any DL grant and UL grants may possibly be sent with reduced power if the embodiment in example 3 is utilized. This means that the macro PDCCH load is likely less than in non-RPS. This results in that the interference on PDCCH for micro UEs in inner zone will be different for RPS and non-RPS. Different link adaptation loops for RPS and non-RPS may thus better utilize the limited PDCCH resource.

Example 5—PDCCH Link Adaptation for Micro Outer Zone UEs

For UEs connected to the micro RBS 101 which are in the range expansion zone 106, typically neither DL nor UL grant is transmitted in non-RPS due to high interference from macro RBS 102. PDSCH transmissions are natural to avoid since such transmissions likely fail or are too costly compared to scheduling UEs in inner zone 105. However, sending UL grants on PDCCH is more likely to succeed since PDCCH is more robust than PDSCH. Therefore, the PDCCH may be possible to decode further out in the range expansion zone 106 than the PDSCH. This proposes that micro UEs in range expansion zone can receive UL grants in non-RPS, while in RPS both DL and UL grants can be sent.

A similar solution for PDCCH link adaptation for UL grants as in example 3 can be used.

Example 6—PDCCH SINR Offset

Figure 11:
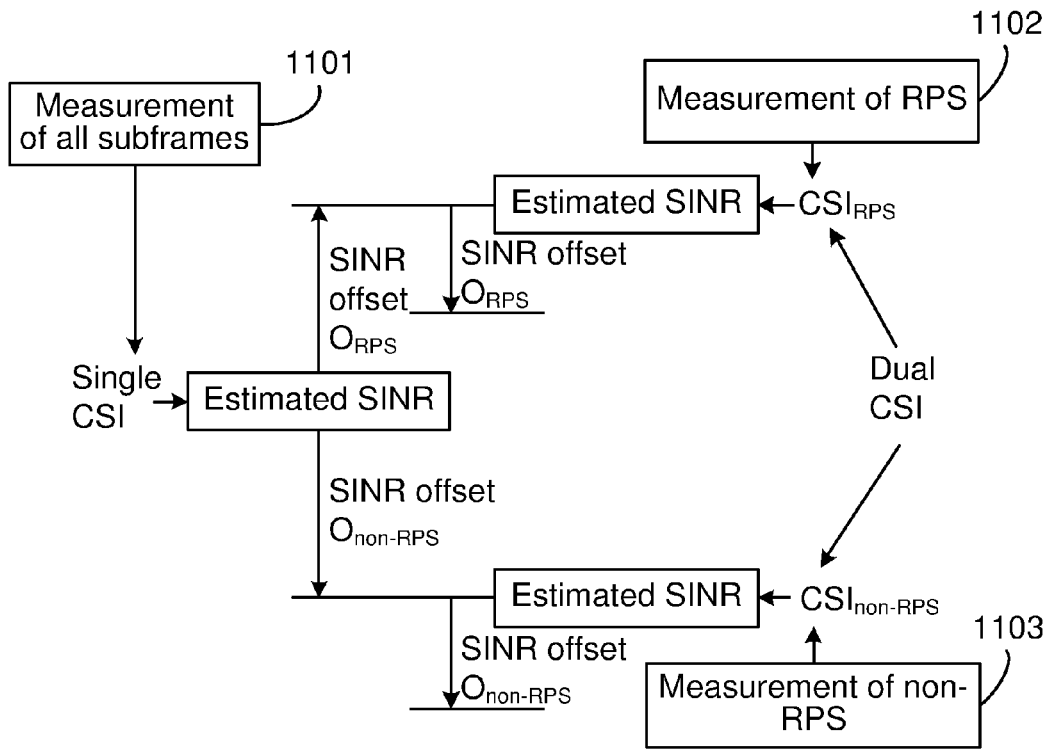
FIG. 11 is a schematic flow chart of another embodiment of a method of the present disclosure.

As mentioned in example 3, SINR offset $O_{RPS}$ and $O_{non-RPS}$ can be applied to the PDCCH SINR directly estimated from the Channel State Information (CSI) measurement. $O_{RPS}$ and $O_{non-RPS}$ are configurable SINR offsets in dB for RPS and non-RPS, respectively. Depending on CSI measurement subframes, different PDCCH SINR offsets $O_{RPS}$ and $O_{non-RPS}$ can be applied (see FIG. 11).

UEs without subframe subset measurement capability measure 1101 all subframes and report a single CSI. It is usually an optimistic value for the RPS 107 and pessimistic value for non-RPS 108.

UEs with subframe subset measurement capability can measure 1102 and 1103 the subset of the subframes and report two CSIs, one for RPS 107 and one for non-RPS 108. More accurate CSI is then reported, and small PDCCH SINR offset or zero SINR offset can be applied.

In case of RPS in macro RBS 102, the Common Reference Signal (CRS) power is not reduced. Estimated PDCCH SINR from CSI is optimistic value for RPS with reduced PDCCH power. Extra SINR offset $O_{RPS}$ can be applied.

Figure 12:
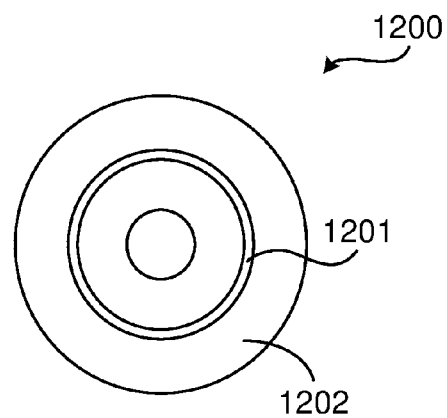
FIG. 12 schematically illustrates an embodiment of a computer program product of the present disclosure.

FIG. 12 illustrates a computer program product 1200. The computer program product 1200 comprises a computer readable medium 1202 comprising a computer program 1201 in the form of computer-executable components 1201. The computer program/computer-executable components 1201 may be configured to cause a base station 101, e.g. as discussed above, for link adaptation (LA) of a physical downlink control channel (PDCCH) in a radio communication system 100 to perform an embodiment of the method of the present disclosure. The computer program/computer-executable components may be run on the processing unit 102 of the RBS 101 for causing the RBS to perform the method. The computer program product 1200 may e.g. be comprised in a storage unit or memory 202 comprised in the RBS and associated with the processing unit 201. Alternatively, the computer program product 1200 may be, or be part of, a separate, e.g. mobile, storage means, such as a computer readable disc, e.g. CD or DVD or hard disc/drive, or a solid state storage medium, e.g. a RAM or Flash memory.

According to an embodiment, the present disclosure relates to a method of a serving RBS for link adaptation (LA) of PDCCH. The method comprises obtaining information about a reduced power subframe (RPS) pattern used by a neighbouring RBS 102. The method also comprises obtaining an indication of a reception quality of the PDCCH at a user equipment (UE) 103. The method also comprises determining whether the obtained indication relates to an RPS or a non-RPS according to the obtained information. The method also comprises controlling a first LA loop for a PDCCH to the first UE, said first LA loop relating to non-RPS. The method also comprises controlling a second LA loop for the PDCCH to the UE, said second LA loop relating to RPS. At least one of the first and second LA algorithms, depending on said determining, is controlled based on said obtained indication of a reception quality.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a serving radio base station, RBS, in a communication system, for link adaptation, LA, of a physical downlink control channel, PDCCH, the method comprising:
   obtaining information about a reduced power subframe, RPS, pattern used by a neighbouring RBS;
   obtaining an indication of a reception quality of the PDCCH at a first user equipment, UE;
   determining whether the obtained indication relates to the reception quality in a subframe in which the neighbouring RBS is not using reduced power in accordance with the obtained RPS information, or to the reception quality in a subframe in which the neighbouring RBS is using reduced power in accordance with the obtained RPS information;
   controlling a first LA algorithm of a first LA loop for a first PDCCH to the first UE, said first LA loop relating to subframes in which the neighbouring RBS is not using reduced power in accordance with the obtained RPS information; and
   controlling a second LA algorithm of a second LA loop for the first PDCCH to the first UE, said second LA loop relating to subframes in which the neighbouring RBS is using reduced power in accordance with the obtained RPS information;
   wherein at least one of the first and second LA algorithms, depending on said determining, is controlled based on said obtained indication of a reception quality.

2. The method of claim 1, further comprising:
   using a first code rate of the PDCCH for subframes in which the neighbouring RBS is not using reduced power in accordance with the obtained RPS information, as a result of the first LA algorithm; and
   using a second code rate of the PDCCH for subframes in which the neighbouring RBS is using reduced power in accordance with the obtained RPS information, as a result of the second LA algorithm;

wherein the second code rate is different from the first code rate.

3. The method of claim 1, wherein the RPS pattern is a pattern of almost blank subframes, AS.

4. The method of claim 1, wherein the RPS pattern indicates at least three different groups of subframes, each group being associated with a respective power level.

5. The method of claim 1, wherein the communication system is a heterogeneous communication system in which different RBSs have different maximum power levels.

6. The method of claim 5, wherein, the serving RBS has a lower maximum power level than the neighbouring RBS.

7. The method of claim 5, wherein, the serving RBS has about the same maximum power level as the neighbouring RBS.

8. The method of claim 1, wherein the neighbouring RBS is a macro RBS.

9. The method of claim 1, wherein the serving RBS is a micro, pico or femto RBS.

10. The method of claim 1, further comprising:
obtaining information about a reduced power subframe, RPS, pattern used by a second neighbouring RBS;
determining whether the obtained indication of a reception quality relates to the reception quality in a subframe in which the second neighbouring RBS is not using reduced power in accordance with the obtained RPS information, or to the reception quality in a subframe in which the second neighbouring RBS is using reduced power in accordance with the obtained RPS information;
controlling a third LA algorithm of a third LA loop for the first PDCCH to the first UE, said third LA loop relating to subframes in which the neighbouring RBS is not using reduced power and in which the second neighbouring RBS is using reduced power in accordance with the obtained RPS information; and
controlling a fourth LA algorithm of a fourth LA loop for the first PDCCH to the first UE, said fourth LA loop relating to subframes in which the neighbouring RBS is using reduced power and in which the second neighbouring RBS is not using reduced power in accordance with the obtained RPS information;
wherein at least one of the third and fourth LA algorithms, depending on said determining, is controlled based on said obtained indication of a reception quality.

11. The method of claim 1, wherein the obtaining of an indication of a reception quality comprises receiving channel state information, CSI, reports from the first UE and relating to a physical downlink shared channel, PDSCH, between the serving RBS and said first UE.

12. The method of claim 1, wherein the obtaining of an indication of a reception quality comprises detecting whether an expected transmission from the first UE is received or not in response to a PDCCH transmission from the serving RBS.

13. The method of claim 1, wherein the obtaining of an indication of a reception quality comprises receiving channel quality information about the PDCCH from the first UE.

14. The method of claim 1, further comprising:
obtaining an indication of a reception quality of a second PDCCH at a second user equipment, UE;
determining whether the obtained indication of a reception quality of a second PDCCH relates to the reception quality in a subframe in which the neighbouring RBS is not using reduced power in accordance with the obtained RPS information, or to the reception quality in a subframe in which the neighbouring RBS is using reduced power in accordance with the obtained RPS information;
controlling a first LA algorithm of a first LA loop for the second PDCCH to the second UE, said first LA loop for the second PDCCH relating to the subframes in which the neighbouring RBS is not using reduced power in accordance with the obtained RPS information; and
controlling a second LA algorithm of a second LA loop for the second PDCCH to the second UE, said second LA loop for the second PDCCH relating to the subframes in which the neighbouring RBS is using reduced power in accordance with the obtained RPS information; wherein at least one of the first and second LA algorithms for the second PDCCH, depending on said determining, is controlled based on said obtained indication of a reception quality of said second PDCCH.

15. The method of claim 1, wherein the RPS information is obtained from the neighbouring RBS over an X2 interface between the serving RBS and the neighbouring RBS.

16. A computer program product comprising a non-transitory computer readable medium and a computer program stored on the computer readable medium, the computer program comprising computer readable code, which when run in a computer being configured as a radio base station, RBS, causes the computer to perform the method of claim 1.

17. A serving radio base station, RBS, comprising:
a processor; and
a memory storing instructions that, when executed, cause the radio base station to perform operations comprising:
obtaining information about a reduced power subframe, RPS, pattern used by a neighbouring RBS;
obtaining an indication of a reception quality of the PDCCH at a first user equipment, UE;
determining whether the obtained indication relates to the reception quality in a subframe in which the neighbouring RBS is not using reduced power in accordance with the obtained RPS information, or to the reception quality in a subframe in which the neighbouring RBS is using reduced power in accordance with the obtained RPS information;
controlling a first LA algorithm of a first LA loop for a first PDCCH to the first UE, said first LA loop relating to subframes in which the neighbouring RBS is not using reduced power in accordance with the obtained RPS information; and
controlling a second LA algorithm of a second LA loop for the first PDCCH to the first UE, said second LA loop relating to subframes in which the neighbouring RBS is using reduced power in accordance with the obtained RPS information;
wherein at least one of the first and second LA algorithms, depending on said determining, is controlled based on said obtained indication of a reception quality.

18. A computer program product comprising a non-transitory computer readable medium storing computer program code for link adaptation, LA, of a physical downlink control channel, PDCCH, the computer program code when run on a radio base station, RBS, cause the RBS to perform operations comprising:
obtaining information about a reduced power subframe, RPS, pattern used by a neighbouring RBS;
obtaining an indication of a reception quality of the PDCCH at a first user equipment, UE;

determining whether the obtained indication relates to the reception quality in a subframe in which the neighbouring RBS is not using reduced power in accordance with the obtained RPS information, or to the reception quality in a subframe in which the neighbouring RBS is using reduced power in accordance with the obtained RPS information;

controlling a first LA algorithm of a first LA loop for a first PDCCH to the first UE, said first LA loop relating to subframes in which the neighbouring RBS is not using reduced power in accordance with the obtained RPS information; and controlling a second LA algorithm of a second LA loop for the first PDCCH to the first UE, said second LA loop relating to subframes in which the neighbouring RBS is using reduced power in accordance with the obtained RPS information;

wherein at least one of the first and second LA algorithms, depending on said determining, is controlled based on said obtained indication of a reception quality.

* * * * *